United States Patent
Dunn et al.

(10) Patent No.: US 10,801,644 B2
(45) Date of Patent: Oct. 13, 2020

(54) PIPELAYING GUIDANCE

(71) Applicant: Caterpillar Inc., Deerfield, IL (US)

(72) Inventors: James Dunn, Edwards, IL (US); Wes Holm, Metamora, IL (US); Leo Chen, Peoria, IL (US); Tim Camacho, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 16/259,807

(22) Filed: Jan. 28, 2019

(65) Prior Publication Data
US 2020/0240548 A1 Jul. 30, 2020

(51) Int. Cl.
| | | |
|---|---|---|
| *G01L 5/16* | (2020.01) | |
| *G01M 5/00* | (2006.01) | |
| *F16L 1/00* | (2006.01) | |
| *F16L 1/036* | (2006.01) | |
| *G01L 5/163* | (2020.01) | |
| *G01L 5/167* | (2020.01) | |
| *G01L 5/166* | (2020.01) | |

(52) U.S. Cl.
CPC .............. *F16L 1/036* (2013.01); *G01L 5/163* (2013.01); *G01L 5/166* (2013.01); *G01L 5/167* (2013.01); *G01M 5/0058* (2013.01)

(58) Field of Classification Search
CPC ....... F16L 1/036; G01M 5/0058; G01L 5/167; G01L 5/163; G01L 5/166
See application file for complete search history.

(56) References Cited

U.S. PATENT DOCUMENTS

| | | | | |
|---|---|---|---|---|
| 3,668,878 A | * | 6/1972 | Jones ................... | G05D 1/0206 405/167 |
| 4,020,952 A | * | 5/1977 | Scodino ................. | B66C 23/18 414/745.6 |
| 4,030,311 A | * | 6/1977 | Rafferty ................. | F16L 1/225 405/166 |
| 4,257,718 A | * | 3/1981 | Rosa ...................... | F16L 1/225 405/167 |
| 4,654,520 A | * | 3/1987 | Griffiths ................. | G01B 11/18 250/227.14 |
| 4,755,947 A | * | 7/1988 | Braschler ............. | G05D 1/0208 405/158 |
| 5,533,834 A | * | 7/1996 | Recalde ................. | F16L 1/202 405/166 |

(Continued)

FOREIGN PATENT DOCUMENTS

| | | |
|---|---|---|
| CN | 101963533 A | 2/2011 |
| CN | 203037388 U | 7/2013 |
| CN | 103277583 B | 6/2015 |

*Primary Examiner* — Edwin J Toledo-Duran
(74) *Attorney, Agent, or Firm* — Harrity & Harrity LLP

(57) ABSTRACT

A device for providing pipelaying guidance is disclosed. The device may determine an original shape of a pipeline that comprises a plurality of pipeline segments. The device may obtain current location data concerning a respective position of each pipeline segment of the plurality of pipeline segments, and may determine a current shape of the pipeline based on the current location data. The device may calculate, based on the original shape of the pipeline and the current shape of the pipeline, stress information concerning the pipeline, and may perform one or more actions based on the stress information.

20 Claims, 8 Drawing Sheets

(56) References Cited

U.S. PATENT DOCUMENTS

| | | | | |
|---|---|---|---|---|
| 5,978,739 A * | 11/1999 | Stockton | E21B 41/0014 | 702/6 |
| 6,243,483 B1 * | 6/2001 | Petrou | F17D 5/00 | 348/144 |
| 6,243,657 B1 * | 6/2001 | Tuck | G01N 29/2412 | 702/150 |
| 6,256,090 B1 * | 7/2001 | Chen | G01B 11/18 | 250/227.14 |
| 6,328,502 B1 * | 12/2001 | Hickey | B63B 35/03 | 405/168.3 |
| 7,646,945 B2 * | 1/2010 | Jones | E21B 17/01 | 385/13 |
| 7,751,977 B2 * | 7/2010 | Winkler | G01C 21/00 | 701/21 |
| 8,074,720 B2 * | 12/2011 | Radi | E21B 19/004 | 166/350 |
| 8,610,882 B2 * | 12/2013 | Roberts | E21B 47/007 | 356/32 |
| 9,183,527 B1 * | 11/2015 | Close | G06Q 50/06 | |
| 9,506,580 B2 * | 11/2016 | Bianchi | F16L 1/235 | |
| 10,041,856 B2 * | 8/2018 | McNeilly | G01M 5/0025 | |
| 2002/0021942 A1 * | 2/2002 | Willis | F16L 1/23 | 405/166 |
| 2002/0189806 A1 * | 12/2002 | Davidson | E21B 33/0355 | 166/250.01 |
| 2003/0056954 A1 * | 3/2003 | Headworth | E21B 17/18 | 166/302 |
| 2004/0035216 A1 * | 2/2004 | Morrison | E21B 17/015 | 73/800 |
| 2004/0042342 A1 * | 3/2004 | Hudson | G05D 1/0692 | 367/131 |
| 2004/0206187 A1 * | 10/2004 | Williams | E21B 47/007 | 73/766 |
| 2005/0100414 A1 * | 5/2005 | Salama | E21B 17/01 | 405/224.2 |
| 2005/0283276 A1 * | 12/2005 | Prescott | E21B 47/06 | 700/282 |
| 2006/0045408 A1 * | 3/2006 | Jones | G01L 1/246 | 385/12 |
| 2006/0065401 A1 * | 3/2006 | Allen | E21B 44/00 | 166/345 |
| 2009/0217769 A1 * | 9/2009 | Roberts | G01M 5/0091 | 73/800 |
| 2011/0030875 A1 * | 2/2011 | Conte | F16L 55/1652 | 156/64 |
| 2011/0052324 A1 * | 3/2011 | Bruschi | F16L 1/18 | 405/166 |
| 2011/0178726 A1 * | 7/2011 | Dobbs | G01B 15/02 | 702/35 |
| 2012/0020184 A1 * | 1/2012 | Wilson | G01V 1/201 | 367/16 |
| 2012/0288334 A1 * | 11/2012 | Bellin | B63B 35/03 | 405/160 |
| 2014/0025319 A1 * | 1/2014 | Farhadiroushan | E21B 47/095 | 702/56 |
| 2014/0273677 A1 * | 9/2014 | Critsinelis | F16L 1/24 | 441/11 |
| 2015/0037101 A1 * | 2/2015 | Bianchi | F16L 1/225 | 405/166 |
| 2015/0090496 A1 * | 4/2015 | Rempe | E21B 7/04 | 175/45 |
| 2015/0363914 A1 * | 12/2015 | Boyle | G06F 16/58 | 345/629 |
| 2016/0073863 A1 * | 3/2016 | Kuboi | A61B 1/00165 | 600/117 |
| 2016/0101491 A1 * | 4/2016 | Vincent | F16L 58/02 | 29/407.01 |
| 2016/0123500 A1 * | 5/2016 | Maidla | B63B 35/03 | 701/32.3 |
| 2017/0122878 A1 * | 5/2017 | Ono | G01B 11/245 | |
| 2018/0095455 A1 * | 4/2018 | Silva | G05B 23/0243 | |
| 2018/0181136 A1 * | 6/2018 | Loosararian | G05D 1/0274 | |
| 2018/0209869 A1 * | 7/2018 | Kishi | G01L 5/00 | |
| 2018/0356559 A1 * | 12/2018 | Ruskin | F16L 9/127 | |

* cited by examiner

PIPELAYING GUIDANCE

TECHNICAL FIELD

The present disclosure relates generally to pipelayers, and more particularly, to a pipelaying guidance device.

BACKGROUND

Pipelayers are specialized vehicles used for installing large, heavy pipeline segments into or above ground. The pipeline segments can be attached together (e.g., via weld points) to form a pipeline. Such a pipeline may be used, for example, to carry oil and gas from remote well locations over vast distances to a receiving station or refinery. This can reduce and/or avoid transportation costs for shipping, trucking, or otherwise moving the oil and gas. In addition to pipelines for petroleum products, pipelayers can also be used to install pipelines for other materials, or for installing of drain tiles, culverts, or other irrigation and drainage structures.

Installation of such pipelines is often very challenging. In some cases, pipeline segments are welded together, end to end, to form a vast pipeline that can extend hundreds or thousands of meters and weigh several hundred tons. In such cases, multiple pipelayers are used to lift, move, and lay the pipeline into a final position. If the pipeline becomes distorted, deformed, and/or the like as the pipelayers lay the pipeline into the final position, the pipeline may be subject to excessive stress that weakens the pipeline, one or more pipeline segments, one or more weld points between pipeline segments, and/or the like. This may result in a pipeline failure (e.g., a crack in the pipeline while laying the pipeline, a crack that is created when the pipeline is in use and under pressure, and/or the like). The pipelayers therefore need to work in a coordinated fashion to lay the pipeline that minimizes stress on the pipeline. However, an operator of a pipelayer often does not know how operation of the pipelayer is affecting the stress on the pipeline, which makes coordinating the operation of multiple pipelayers difficult.

One attempt to monitor stress on a pipeline as the pipeline is laid is disclosed in U.S. Pat. No. 9,506,580 ("the '580 patent") that issued to Saipem S.P.A. on Nov. 29, 2016. In particular, the '580 patent discloses a centralized monitoring system configured to real-time monitor stress induced on a pipeline laid on the bed of a body of water. Per the '580 patent, the centralized monitoring system acquires data related to a configuration of a lay ramp, data related to a laying vessel, and data related to stress induced in the pipeline.

While the centralized monitoring system of the '580 patent calculates a stress induced in the pipeline, the centralized monitoring system does so only in two dimensions based on a position of the lay ramp, a position of the lay vessel, and/or a position of the pipeline. As such, the centralized monitoring system of the '580 patent does not provide a robust three-dimensional model of the stress on the pipeline. Moreover, the centralized monitoring system of the '580 patent does not acquire data about a respective position and/or a respective orientation of each pipeline segment of the pipeline, which limits the ability of the centralized monitoring system to accurately calculate the stress on the pipeline.

The pipelaying guidance device of the present disclosure solves one or more problems set forth above and/or other problems in the art.

SUMMARY

According to some implementations, the present disclosure is related to a method that may include obtaining, by a pipelaying guidance device, first information concerning an original shape of a pipeline that comprises a plurality of pipeline segments. The method may include obtaining, by the pipelaying guidance device and from each sensing device of a plurality of sensing devices, second information concerning each sensing device, each sensing device being positioned at a different position along the pipeline. The method may include determining, by the pipelaying guidance device and based on the second information, third information concerning a current shape of the pipeline, and determining, by the pipelaying guidance device and based on the first information and the third information, fourth information concerning stress on the pipeline. The method may include causing, by the pipelaying guidance device, one or more actions to be performed based on the fourth information.

According to some implementations, the present disclosure is related to a device that may include a memory, and one or more processors to determine an original shape of a pipeline that comprises a plurality of pipeline segments. The one or more processors may obtain current location data concerning a respective position of each pipeline segment of the plurality of pipeline segments, and may determine a current shape of the pipeline based on the current location data. The one or more processors may calculate, based on the original shape of the pipeline and the current shape of the pipeline, stress information concerning the pipeline, and may perform one or more actions based on the stress information.

According to some implementations, the present disclosure is related to a system that may include a plurality of pipelayers, a plurality of devices, and a pipelaying guidance device. The pipelaying guidance device may determine an original shape of a pipeline comprised of a plurality of pipeline segments, may obtain current location data from the plurality of devices, and may determine a current shape of the pipeline based on the current location data. The pipelaying guidance device may calculate, based on the original shape of the pipeline and the current shape of the pipeline, stress information concerning the pipeline, and may generate, based on the stress information, one or more instructions. The pipelaying guidance device may send the one or more instructions to at least one pipelayer of the plurality of pipelayers to cause the at least one pipelayer to perform an action.

DETAILED DESCRIPTION

This disclosure relates to a pipelaying guidance device providing pipelaying guidance to one or more pipelayers for the one or more pipelayers to lay a pipeline in a coordinated manner. In some implementations, a pipelayer of the one or more pipelayers may be operated by a human operator. The pipelayer of the one or more pipelayers may be autonomous and/or semi-autonomous. The pipelayer may be operator controlled with autonomous control capability that may be activated by the operator. Some implementations described herein relate to a guidance device for one or more various machines that perform actions in a coordinated manner, such as a haul truck, a backhoe loader, a wheel loader, a compactor, a harvester, an excavator, an industrial loader, a road reclaimer, a skid steer loader, a skidder, a telehandler, a tractor, a dozer, a tractor scraper, and/or the like.

Figure 1:
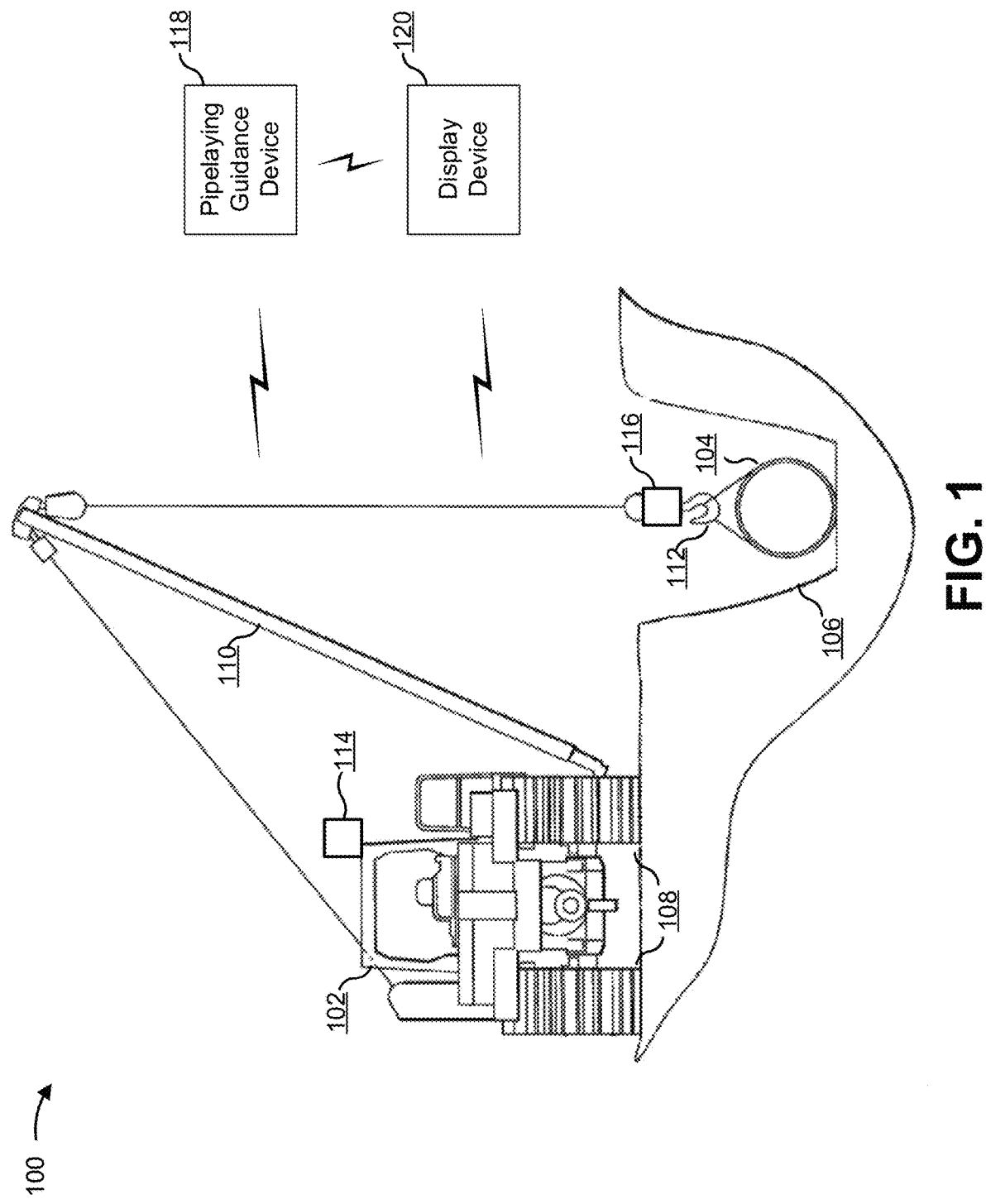
FIGS. 1-2 are diagrams of example implementations described herein.

FIG. 1 is a diagram of an example implementation 100 described herein. Example implementation 100 of FIG. 1 includes a pipelayer 102 laying a pipeline segment 104 in a trench 106. While FIG. 1 shows a single pipelayer 102 laying a single pipeline segment 104, example implementations include a plurality of pipelayers 102 laying a plurality of pipeline segments 104 in a coordinated manner. The plurality of pipeline segments 104 may comprise a pipeline. The plurality of pipeline segments 104 may be connected to each other (e.g., via one or more weld points) to form the pipeline.

In some implementations, the pipelayer 102 may include one or more drive tracks 108, a boom 110, and a hook component 112. The one or more drive tracks 108 may be composed of a series of interlinked track shoes in an oval track and/or high drive configuration. The boom 110 may extend to a particular height at a particular angle from the pipelayer 102. The one or more lifting cables may extend from the body of the pipelayer 102 to the hook component 112 via the boom 110 to assist in lifting and/or placing the pipeline segment 104. The hook component 112 may include a cradle and/or other mechanism for securing, holding, lifting, and/or placing the pipeline segment 104.

In some implementations, the pipelayer 102 may include a sensing device 114 on the body of the pipelayer 102 and/or a sensing device 116 on the boom 110 and/or the hook component 112. The sensing device 114 and/or sensing device 116 may be mounted on, integrated into, attached to, and/or affixed to the pipelayer 102 via the body of the pipelayer 102, the boom 110, the hook component 112, and/or any other component of pipelayer 102 not shown in FIG. 1, such as a winch, a windshield, a pulley, and/or the like of the pipelayer 102. Additionally, or alternatively, the sensing device 114 and/or the sensing device 116 may be on and/or attached to the pipeline segment 104 (e.g., mounted on, attached to, and/or affixed to the pipeline segment 104 using a magnet, a fastener, an adhesive, and/or the like). The sensing device 114 and/or the sensing device 116 may be a position sensor, such as a potentiometer, a rotary position sensor, an optical sensor (e.g., a laser doppler vibrometer), a piezo-electric transducer, a relative position sensor, a global positioning system (GPS) device, and/or the like; a strain gauge; a camera device, and/or the like.

The sensing device 114 and/or the sensing device 116 may determine a position and/or an orientation of the pipeline segment 104. For example, where sensing device 114 is a camera device, the sensing device 114 may obtain image data concerning the pipeline segment 104 and process the image data (e.g., using a computer vision technique, such as an object detection technique) to determine the position and/or the orientation of the pipeline segment 104. Further, the sensing device 114 may be positioned to provide a vantage point of the pipeline segment 104 to obtain image data concerning the pipeline segment 104 via a field of view of the camera device (e.g., the sensing device 114 may be positioned high on the boom 110, a tower, a drone, and/or the like to capture image data concerning the pipeline segment 104.) As another example, where the sensing device 116 is a GPS device, the sensing device 116 may obtain GPS data that concerns the GPS device, such as a position and/or orientation of the GPS device, and may process the GPS data to determine the position and/or the orientation of the pipeline segment 104 (e.g., based on a known relationship between the position and/or orientation of the GPS device and the position and/or orientation of the pipeline segment 104). Moreover, the sensing device 116 may be positioned on or near (e.g., on the hook component 112) the pipeline segment 104 to facilitate obtaining accurate GPS data regarding the position and/or orientation of the pipeline segment 104. In another example, where the sensing device 114 is a relative position sensor on and/or attached to the boom 110, the sensing device 114 may obtain relative position data concerning a position of the relative position sensor and/or boom 110 in relation to one or more other relative position sensors and/or other booms 110 of other pipelayers 102, and may process the relative position data to determine the position and/or orientation of the pipeline segment 104 (e.g., based on a known relationship between the relative position of the relative position sensor and/or boom 110 and the position and/or orientation of the pipeline segment 104.)

The sensing device 114 and/or the sensing device 116 may determine a strain and/or stress of the pipeline segment 104. For example, where the sensing device 116 is a strain gauge on and/or attached to the pipeline segment 104, the sensing device 116 may obtain strain data that concerns the strain gauge to determine a strain and/or stress of the pipeline segment 104 (e.g., based on a known relationship between a strain on the strain gauge and a strain and/or stress of the pipeline segment 104). As another example, where the sensing device 114 is a position sensor, such as an optical sensor, on and/or attached to the pipeline segment, the position sensor may obtain position data about a shape and/or a deformation of one or more dimensions of the pipeline segment 104 and determine a strain and/or stress of the pipeline segment 104 (e.g., based on a known relationship between the shape and/or the deformation of the one or more dimensions of the pipeline segment 104 and the strain and/or the stress of the pipeline segment 104).

In some implementations, the pipelayer 102 may include a control console (not shown in FIG. 1) from which an operator can control the one or more drive tracks 108, the boom 110, and/or the hook component 112. The pipelayer 102 may include an electronic control module (ECM) (not shown in FIG. 1) that may be configured to autonomously and/or semi-autonomously control the drive tracks 108, the boom 110, and/or the hook component 112.

In some implementations, the pipelayer 102 may be associated with a pipelaying guidance device 118 and/or display device 120. The plurality of pipelayers 102 may be associated with a single pipelaying guidance device 118 and/or a single display device 120. Each pipelayer 102, of the plurality of pipelayers 102, may be associated with a respective display device 120. The pipelaying guidance device 118 may monitor and/or facilitate the laying of the pipeline by the plurality of pipelayers 102 (e.g., by monitoring and/or facilitating the laying of the pipeline in a coordinated manner by the plurality of pipelayers 102). The display device 120 may display information concerning the laying of the pipeline. The pipelaying guidance device 118 and/or the display device 120 may be part of, incorporated in, attached to, in communication with, and/or the like one or more pipelayers 102 of the plurality of pipelayers 102.

In some implementations, the control console, the ECM, the sensing device 114, and/or the sensing device 116 of a pipelayer 102, of the plurality of pipelayers 102, the pipelaying guidance device 118, and/or the display device 120 may communicate via a wired connection, a wireless connection, or a combination of wired and wireless connections. For example, the control console, the ECM, the sensing device 114, and/or the sensing device 116 of the pipelayer 102, the pipelaying guidance device 118, and/or the display device 120 may communicate via a wired connection when the control console, the ECM, the sensing device 114, and/or the sensing device 116 of the pipelayer 102, the pipelaying guidance device 118, and/or the display device 120 are part of (e.g., mounted on, integrated into, attached to, affixed to, and/or the like) a single pipelayer 102. Additionally, or alternatively, the control console, the ECM, the sensing device 114, and/or the sensing device 116 of the pipelayer 102, the pipelaying guidance device 118, and/or the display device 120 may communicate via a wireless communication protocol that supports mesh networking, such as Bluetooth, Zigbee, and/or the like.

In some implementations, the pipelaying guidance device 118 may communicate with the sensing device 114 and/or the sensing device 116 of each pipelayer 102, of the plurality of pipelayers 102, to obtain current (e.g., real-time, or near real-time) strain and/or stress data. For example, the pipelaying guidance device 118 may communicate with a position sensor, strain gauge, and/or the like of the pipelayer 102 to obtain the strain and/or stress data. The current strain and/or stress data can concern, for each pipelayer 102, a strain and/or stress of sensing device 114 and/or a of sensing device 116, a strain and/or stress of pipeline segment 104, and/or the like. In this way, the pipelaying guidance device 118 can determine a current strain and/or stress of each pipeline segment 104 of the plurality of pipeline segments 104 that comprise the pipeline.

Additionally, or alternatively, the pipelaying guidance device 118 may determine an original shape of the pipeline (e.g., a shape of the pipeline before the pipeline is laid) that comprises the plurality of pipeline segments 104. The pipelaying guidance device 118 may obtain information concerning the original shape of the pipeline, such as blue print information concerning the pipeline, computer assisted drawing (CAD) data concerning the pipeline, three-dimensional (3D) rendering data of the pipeline, and/or the like. For example, the pipelaying guidance device 118 may obtain the information concerning the original shape of the pipeline from a server device associated with a contractor supervising the laying of the pipeline. The pipelaying guidance device 118 may obtain the information concerning the original shape of the pipeline from the sensing device 114 and/or the sensing device 116. The information concerning the original shape of the pipeline may include information about a 3D shape of the pipeline.

In some implementations, the pipelaying guidance device 118 may communicate with the sensing device 114 and/or the sensing device 116 of each pipelayer 102, of the plurality of pipelayers 102, to obtain current (e.g., real-time, or near real-time) location data. For example, the pipelaying guidance device 118 may communicate with a position sensor, a camera device, and/or the like of the pipelayer 102 to obtain the location data. The current location data can concern, for each pipelayer 102, a location of sensing device 114 and/or a location of sensing device 116, a position of pipeline segment 104, an orientation of pipeline segment 104, and/or the like. In this way, the pipelaying guidance device 118 can determine a current position and/or a current orientation of each pipeline segment 104 of the plurality of pipeline segments 104 that comprise the pipeline.

In some implementations, the pipelaying guidance device 118 may determine a current shape of the pipeline. The pipelaying guidance device 118 may determine information concerning the current shape of the pipeline based on the current location data. For example, the pipelaying guidance device 118 may parse the current location data to determine and/or identify the position and/or the orientation of each pipeline segment 104, of the plurality of pipeline segments 104, and may process the position and/or the orientation of each pipeline segment 104, of the plurality of pipeline segments 104, to determine the information concerning the current shape of the pipeline.

The position of a pipeline segment 104 can be associated with three dimensions (e.g., x, y, and z parameters) and the orientation of the pipeline segment 104 can be associated with three dimensions (e.g., rx, ry, and rz parameters). The pipelaying guidance device 118 may process, for each pipeline segment 104, the three dimensions associated with the position of the pipeline segment 104 and/or the three dimensions associated with the orientation of the pipeline segment 104 to determine the information concerning the current shape of the pipeline.

In some implementations, the pipelaying guidance device 118 may determine stress information concerning the pipeline, such as a magnitude of stress on the pipeline, one or more pipeline segments 104, one or more weld points, and/or the like; a distribution of stress on the pipeline, the one or more pipeline segments 104, the one or more weld points, and/or the like; a direction of stress on the pipeline, the one or more pipeline segments 104, the one or more weld points, and/or the like; and/or the like. The stress may include axial stress, shear stress, bending stress, and/or the like. The pipelaying guidance device 118 may calculate, based on the original shape of the pipeline and the current shape of the pipeline, the stress information and/or displacement information concerning the pipeline. For example, the pipelaying guidance device 118 may compare the original shape of the pipeline and the current shape of the pipeline to calculate the stress information concerning the pipeline and/or the displacement information concerning the pipeline (e.g., information on how much the current shape of the pipeline varies from the original shape of the pipeline). As another example, the pipelaying guidance device 118 may process the information concerning the original shape of the pipeline to generate and/or determine an original spline, such as a 3D spline, of the pipeline and may process the information concerning the current shape of the pipeline to generate and/or determine a current spline, such as a 3D spline, of the pipeline. The pipelaying guidance device 118 may compare the original spline of the pipeline and the current spline of the pipeline to determine the stress information and/or displacement information concerning the pipeline. In another example, the pipelaying guidance device 118 may process the information concerning the original shape of the pipeline and/or the information concerning the current shape of the of pipeline using a finite element analysis technique to determine the stress information and/or displacement information concerning the pipeline.

In some implementations, the pipelaying guidance device 118 may determine, based on the original shape of the pipeline, an original shape of a portion of the pipeline, such as an original shape of a subset of the plurality of pipeline segments 104 and may determine, based on the current shape of the pipeline, a current shape of the portion of the pipeline, such as a current shape of the subset of the plurality of pipeline segments 104. The pipelaying guidance device 118 may compare the original shape of the portion of the pipeline and the current shape of the portion of the pipeline to determine particular stress information and/or particular displacement information concerning the portion of the pipeline.

In some implementations, the pipelaying guidance device 118 may perform, or cause to be performed, one or more actions. The pipelaying guidance device 118 may perform, or cause to be performed, the one or more actions based on the stress information and/or displacement information concerning the pipeline, the current strain and/or stress of each pipeline segment 104, and/or the like. For example, the pipelaying guidance device 118 may perform and/or cause the one or more actions to be performed to reduce the magnitude of stress on the pipeline, the one or more pipeline segments 104, the one or more weld points, and/or the like; reduce the distribution of stress on the pipeline, the one or more pipeline segments 104, the one or more weld points, and/or the like; and/or reduce the direction of stress on the pipeline, the one or more pipeline segments 104, the one or more weld points, and/or the like.

In some implementations, the pipelaying guidance device 118 may generate and send one or more instructions to a pipelayer 102, of the plurality of pipelayers 102, to cause the one or more actions to be performed. The pipelaying guidance device 118 may send a message that includes the one or more instructions to the pipelayer 102. The one or more instructions may include an instruction for the operator of the pipelayer 102 to operate the pipelayer 102 to cause the one or more actions to be performed. For example, the operator may interact with the control console, based on the one or more instructions, to move the pipelayer 102, the pipeline segment 104, the one or more drive tracks 108, the boom 110, the hook component 112, and/or the like. The one or more instructions may cause the pipelayer 102 to autonomously and/or semi-autonomously control the pipelayer 102 to cause the one or more actions to be performed. For example, the one or more instructions may include computer code which causes, when executed by the ECM, the pipelayer 102 to move the pipelayer 102, the pipeline segment 104, the one or more drive tracks 108, the boom 110, the hook component 112, and/or the like.

The one or more actions may include moving the boom 110 (e.g., raising the boom 110, lowering the boom 110, rotating the boom 110, adjusting a position and/or orientation of the boom 110, adjusting an angle of the boom 110, and/or the like); moving the hook component 112 (e.g., raising the hook component 112, lowering the hook component 112, rotating the hook component 112, adjusting a position and/or orientation of the hook component 112, adjusting an angle of the hook component 112, and/or the like); moving the one or more drive tracks 108 (e.g., moving the one or more drive tracks 108 toward the pipeline segment 104 and/or the trench 106, moving the one or more drive tracks 108 away from the pipeline segment 104 and/or the trench 106, pivoting the one or more drive tracks 108, adjusting a position and/or orientation of the one or more drive tracks 108, and/or the like); moving the pipelayer 102 (e.g., moving the pipelayer 102 toward the pipeline segment 104 and/or the trench 106, moving the pipelayer 102 away from the pipeline segment 104 and/or the trench 106, rotating the pipelayer 102, adjusting a position and/or orientation of the pipelayer 102 and/or the like); moving the pipeline segment 104 (e.g., raising the pipeline segment 104, lowering the pipeline segment 104, rotating the pipeline segment 104, adjusting a position and/or orientation of the pipeline segment 104, and/or the like); and/or the like.

Additionally, or alternatively, the one or more actions may include causing display of the stress information and/or displacement information concerning the pipeline on the display device 120. The one or more actions may include causing the display device 120 to display the magnitude of stress on the pipeline, the one or more pipeline segments 104, the one or more weld points, and/or the like; the distribution of stress on the pipeline, the one or more pipeline segments 104, the one or more weld points, and/or the like; the direction of stress on the pipeline, the one or more pipeline segments 104, the one or more weld points, and/or the like; and/or the like. The one or more actions may include causing the display device 120 to display a 3D model of the current shape of the pipeline, where the display device 120 displays the stress information relating to axial stress as a first color on the 3D model, the stress information relating to shear stress as a second color on the 3D model, the stress information relating to bending stress as a third color on the 3D model, and/or the like. The one or more actions may include causing the display device 120 to display the 3D model of the current shape as an overlay (e.g., an augmented reality overlay) superimposed on the 3D model of the original shape. In this way, an operator of pipelayer 102 can look at display device 120 to see the stress information and/or see how the current shape varies from the original shape.

As indicated above, FIG. 1 is provided as an example. Other examples may differ from what was described in connection with FIG. 1.

Figure 2:
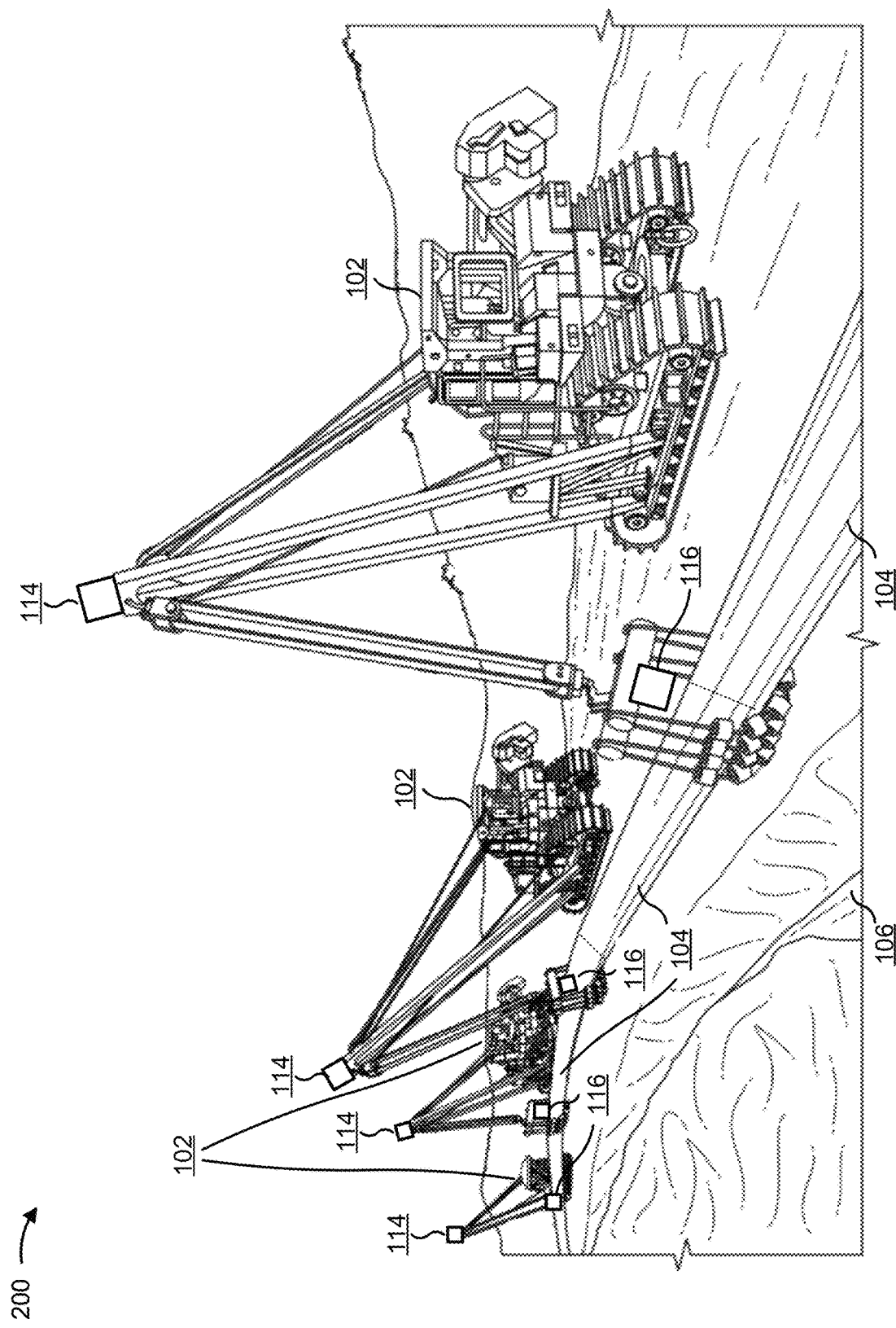

FIG. 2 is a diagram of an example implementation 200 described herein. Example implementation 200 of FIG. 2 includes a plurality of pipelayers 102 laying a plurality of pipeline segments 104 that comprise a pipeline in a trench 106 in a similar coordinated manner as described herein in relation to FIG. 1. Each pipelayer 102 may include and/or be associated with a sensing device 114 and/or a sensing device 116, as described herein in relation to FIG. 1. As shown in FIG. 2, a sensing device 114 and/or a sensing device 116 may be mounted on, integrated into, attached to, and/or affixed to a pipelayer 102 (e.g., on the body of the pipelayer 102, a boom of the pipelayer 102, a hook component of the pipelayer 102) and/or a pipeline segment 104, as described herein in relation to FIG. 1.

Figure 3:
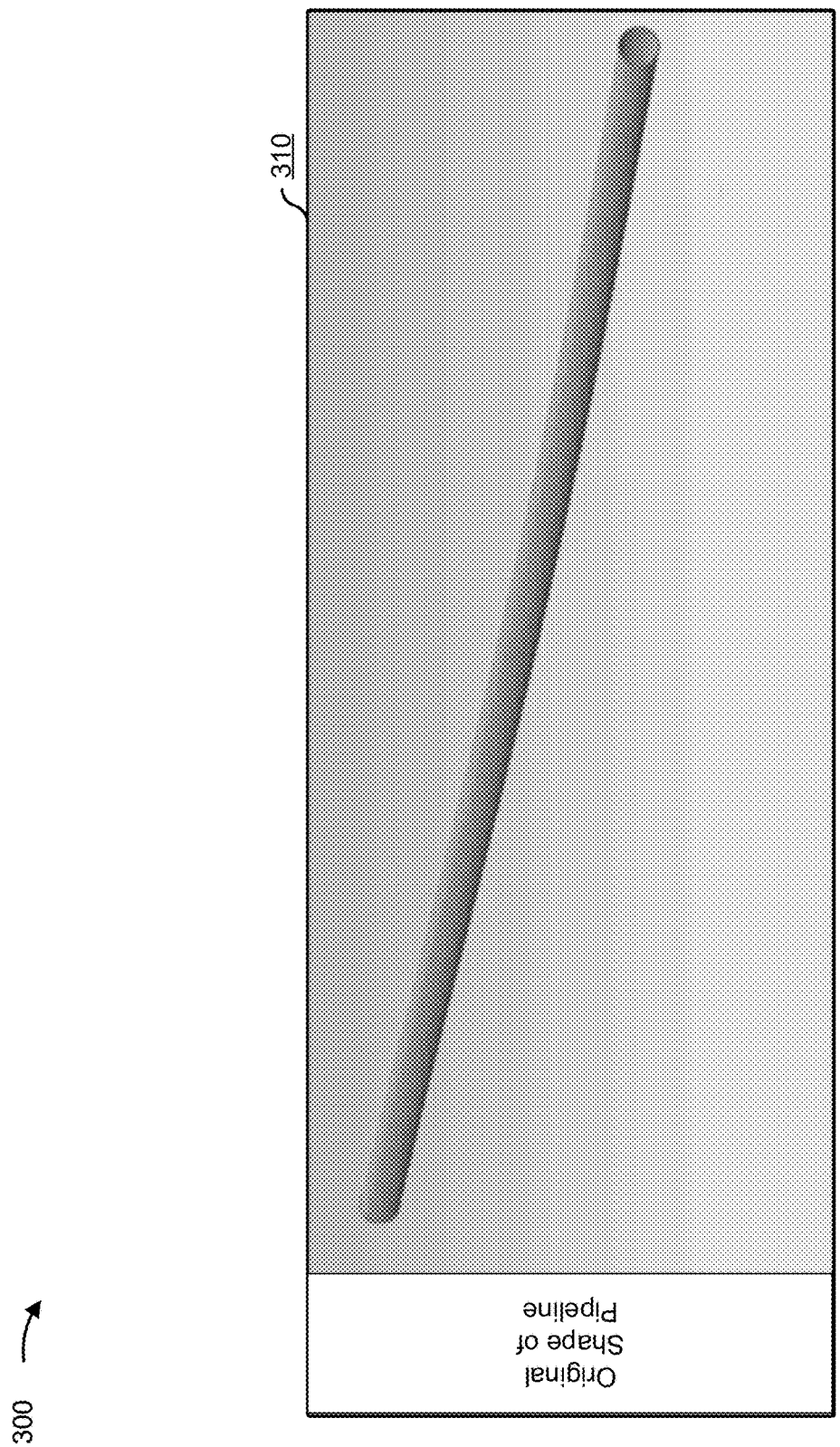
FIGS. 3-5 are diagrams of example visualizations described herein.
Figure 4:
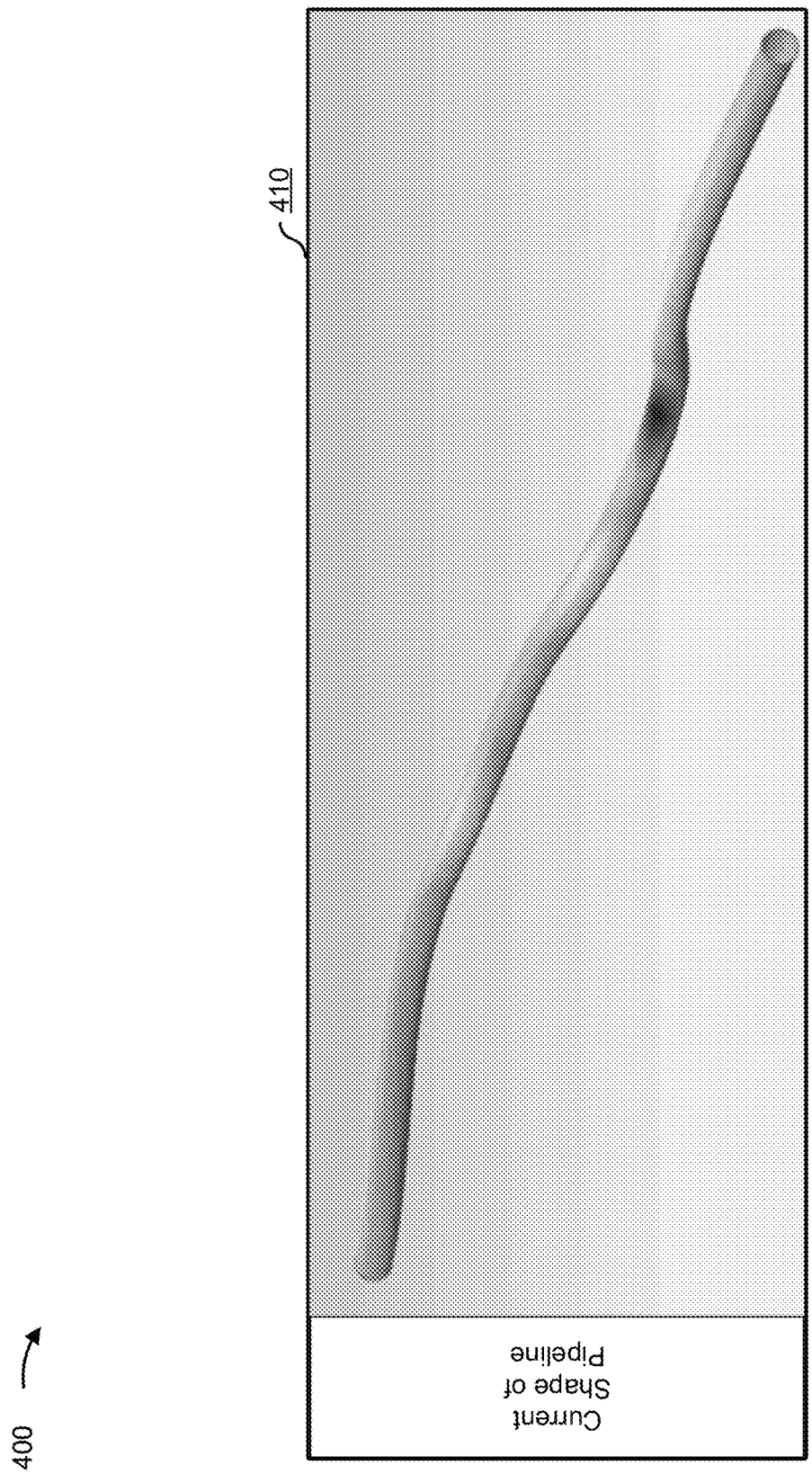
Figure 5:
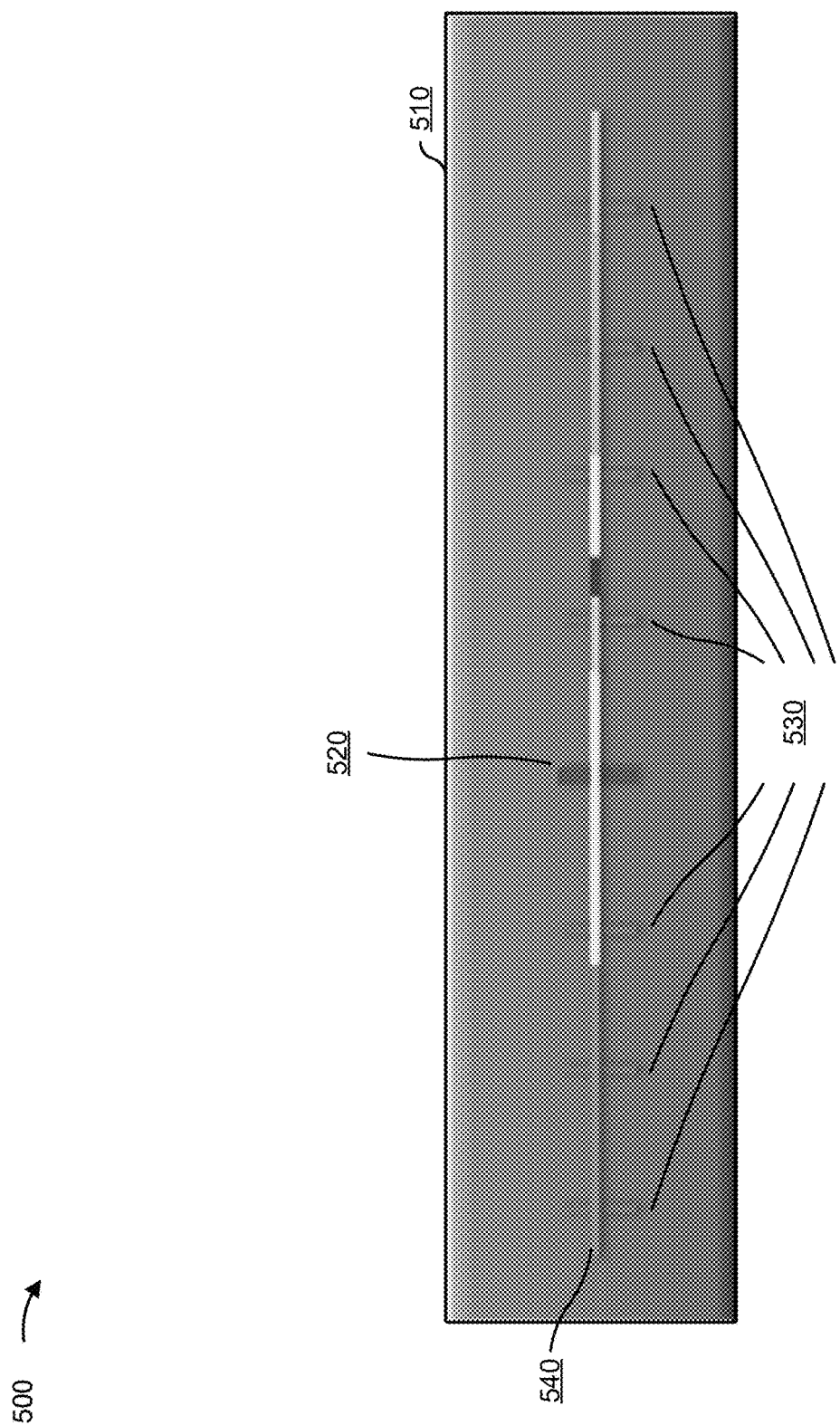

FIGS. 3-5 show example visualizations that may be displayed on display device 120.

As shown in FIG. 3 and example implementation 300, the display device 120 may display a visualization 310 that includes a 3D model of the original shape of the pipeline. The 3D model of the original shape of the pipeline, as indicated by uniform shading, shows that the pipeline was not initially subject to excessive axial stress, shear stress, bending stress, and/or the like.

As shown in FIG. 4 and example implementation 400, display device 120 may display a visualization 410 that includes a 3D model of the current shape of the pipeline. The 3D model of the current shape of the pipeline, as indicated by nonuniform shading, shows that the pipeline is currently subject to axial stress, shear stress, bending stress, and/or the like. Different coloring may be used to indicate different types or magnitudes of stress.

As shown in FIG. 5 and example implementation 500, display device 120 may display a visualization 510 that includes a location of a particular pipelayer 520 and a respective location of each pipelayer of a plurality of pipelayers 530. Visualization 510 may include information about the stress exhibited on each pipeline segment of the pipeline 540. As indicated by nonuniform shading, visualization 510 shows that the pipeline 540 is currently subject to axial stress, shear stress, bending stress, and/or the like. Different coloring may be used to indicate different types or magnitudes of stress.

As indicated above, FIGS. 3-5 are provided as examples. Other examples may differ from what was described in connection with FIGS. 3-5.

Figure 6:
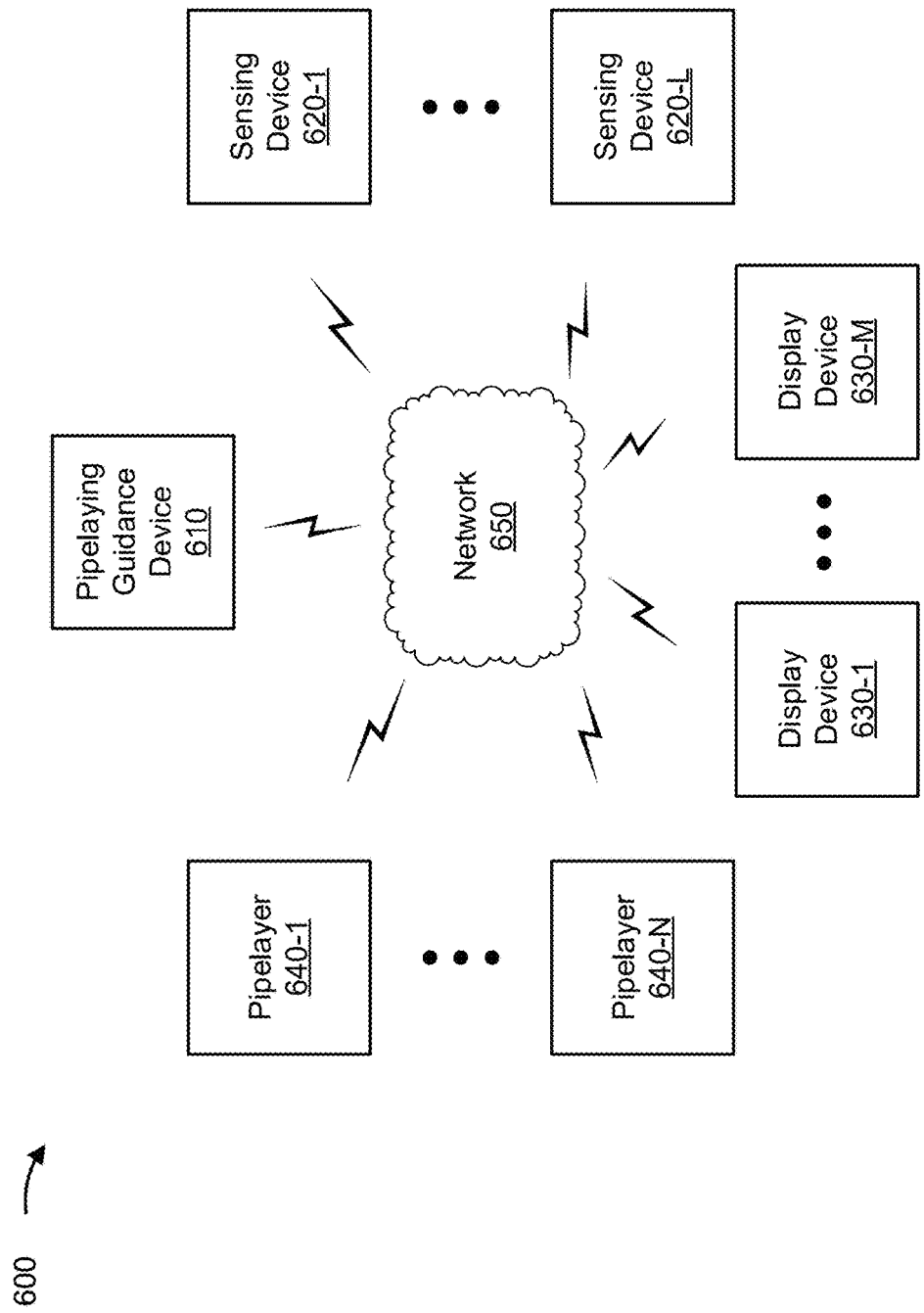
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a pipelaying guidance device 610, one or more sensing devices 620-1 through 620-L (L>1) (hereinafter referred to collectively as "sensing devices 620," and individually as "sensing device 620"), one or more display devices 630-1 through 630-M (M>1) (hereinafter referred to collectively as "display devices 630," and individually as "display device 630"), one or more pipelayers 640-1 through 640-N (N>1) (hereinafter referred to collectively as "pipelayers 640," and individually as "pipelayer 640"), and/or a network 650. Devices of environment 600 may interconnect via wired connections, wireless connections, or a combination of wired and wireless connections.

Pipelaying guidance device 610 includes one or more devices capable of receiving, generating, storing, processing, and/or providing information associated with providing pipelaying guidance. For example, pipelaying guidance device 610 may include a computing device, such as a desktop computer, a laptop computer, a tablet computer, a handheld computer, a mobile phone, and/or the like. Pipelaying guidance device 610 may include and/or communicate with a server device or a group of server devices. Pipelaying guidance device 610 may communicate with sensing device 620 to obtain current location data. Pipelaying guidance device 610 may determine an original shape or current shape of a pipeline. Pipelaying guidance device 610 may perform one or more actions and/or cause pipelayer 640 to perform one or more actions.

Sensing device 620 includes one or more devices capable of determining a position and/or an orientation of a pipeline segment. Sensing device 620 may be a position sensor, such as a potentiometer, a rotary position sensor, an optical sensor (e.g., a laser doppler vibrometer), a piezo-electric transducer, a relative position sensor, a global positioning system (GPS) device, and/or the like; a strain gauge; a camera device, and/or the like. For example, sensing device 620 may be a GPS device, and may obtain and process GPS data to determine the position and/or orientation of the pipeline segment. As another example, sensing device 620 may be a camera device, and may obtain and process image data to determine the position and/or orientation of the pipeline segment. Sensing device 620 may include one or more devices configured to facilitate noncentralized location services, and may obtain noncentralized location data to determine the position and/or orientation of the pipeline segment (e.g., a position and/or orientation of the pipeline segment in relation to other pipeline segments, other devices, and/or the like). Sensing device 620 may be mounted on, integrated into, attached to, and/or affixed to pipelayer 640 (e.g., on a body, a boom, a hook component, and/or the like of pipelayer 640).

Display device 630 includes one or more devices capable of displaying information concerning the laying of a pipeline. For example, display device 630 may display stress information concerning a pipeline. Display device 630 may display a visualization that includes a 3D model of the original shape of the pipeline. Display device 630 may display a visualization that includes a 3D model of the current shape of the pipeline. Display device 630 may display a visualization that includes a location of one or more pipelayers. Display device 630 may be mounted on, integrated into, attached to, and/or affixed to pipelayer 640 (e.g., on a body, a boom, a hook component, and/or the like of pipelayer 640).

Pipelayer 640 includes one or more devices (e.g., specialized vehicles) that may install pipeline segments into or above ground. For example, pipelayer 640 may install pipeline segments based on instructions received from pipelaying guidance device 610. Pipelayer 640 may include one or more drive tracks, a boom, a hook component, and/or the like. Pipelayer 640 may include a control console, an electronic control module (ECM), and/or the like to control the pipelayer 640, the one or more drive tracks, the boom, the hook component, and/or the like. Pipelayer 640 may include sensing device 620, display device 630, and/or the like.

Network 650 includes one or more wired and/or wireless networks. For example, network 650 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network (e.g., a Bluetooth mesh network, a ZigBee mesh network), a low-power, wide-area network (e.g., a narrow band internet of things (NBIoT) network, a Sigfox network, a LoRa network, an LTE-M network, an LTE Cat-M1 network, and/or the like) or the like, and/or a combination of these or other types of networks. While example environment 600 is described to include network 650, in some implementations, one or more of the devices of environment 600 are connected to one another without a network connection (e.g., via a direct wired or wireless connection).

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
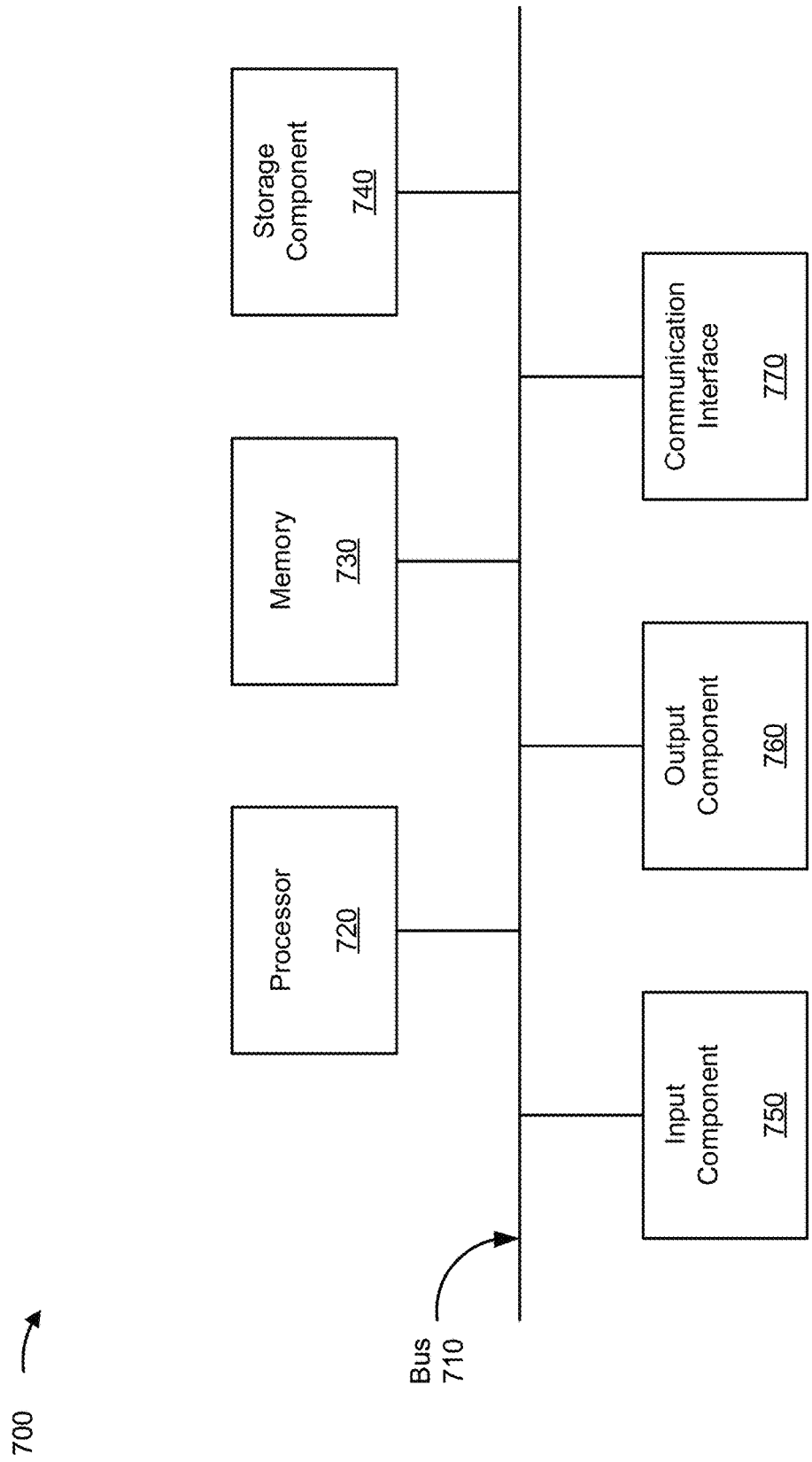
FIG. 7 is a diagram of example components of one or more devices of FIG. 6.

FIG. 7 is a diagram of example components of a device 700. Device 700 may correspond to pipelaying guidance device 610, sensing device 620, display device 630, the control console and/or the ECM of pipelayer 640, and/or the like. Pipelaying guidance device 610, sensing device 620, display device 630, the control console and/or the ECM of pipelayer 640, and/or the like may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a wireless local area network interface, a cellular network interface, or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
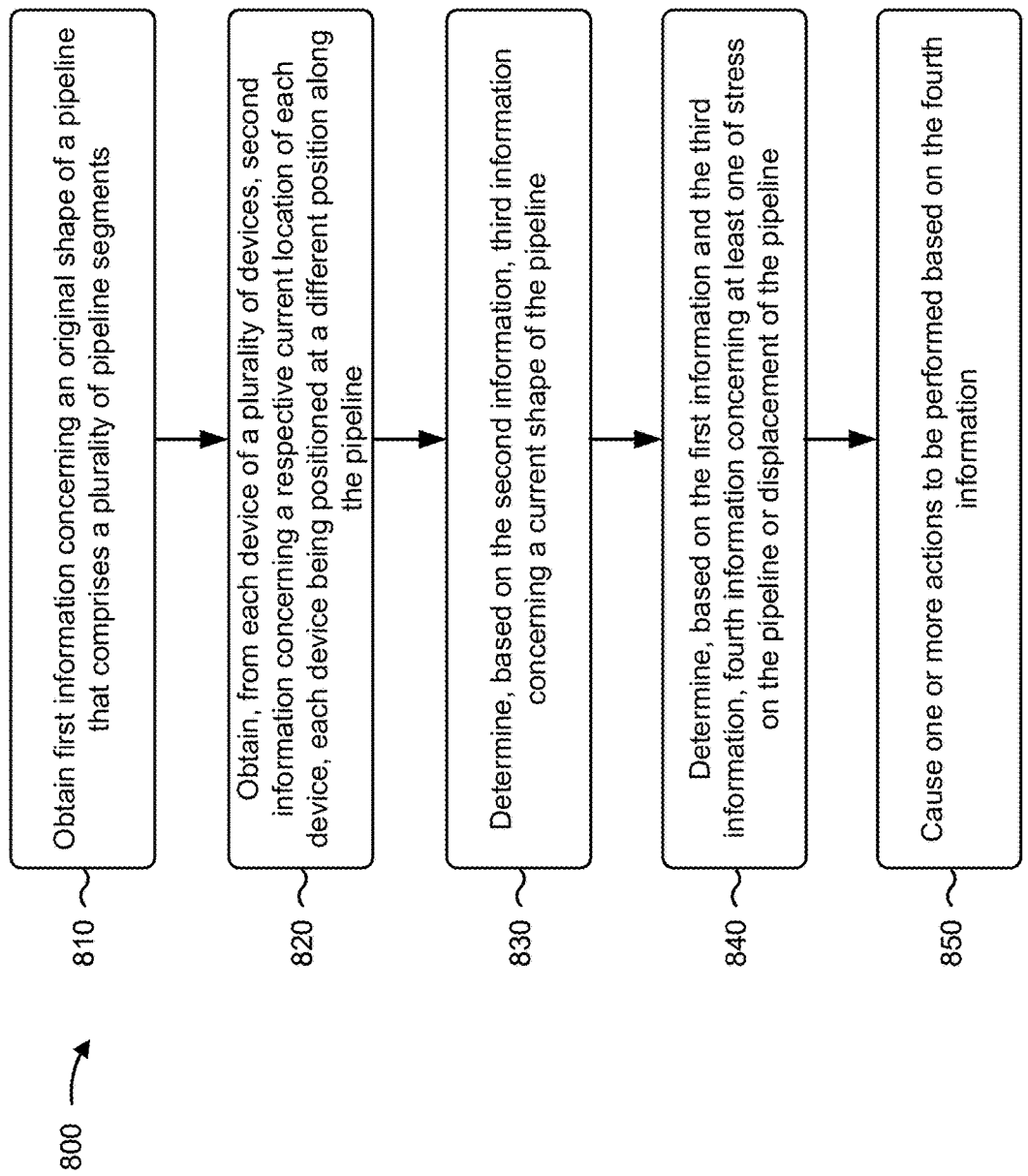
FIG. 8 is a diagram of an example process associated with providing pipelaying guidance.

FIG. 8 is a flow chart of an example process 800 for providing pipelaying guidance. In some implementations, one or more process blocks of FIG. 8 may be performed by a pipelaying guidance device (e.g., pipelaying guidance device 610). In some implementations, one or more process blocks of FIG. 8 may be performed by another device or a group of devices separate from or including the pipelaying guidance device, such as a sensing device (e.g., sensing device 620), a display device (e.g., display device 630), a pipelayer (e.g., pipelayer 640), and/or the like.

As shown in FIG. 8, process 800 may include obtaining first information concerning an original shape of a pipeline that comprises a plurality of pipeline segments (block 810). For example, the pipelaying guidance device (e.g., using one or more processors, one or more memories, and/or the like) may obtain first information concerning an original shape of a pipeline that comprises a plurality of pipeline segments, as described above.

As further shown in FIG. 8, process 800 may include obtaining, from each device of a plurality of devices, second information concerning a respective current location of each device, each device being positioned at a different position along the pipeline (block 820). For example, the pipelaying guidance device (e.g., using one or more processors, one or more memories, and/or the like) may obtain, from each device of a plurality of devices, second information concerning a respective current location of each device, as described above. Each device may be positioned at a different position along the pipeline. Each device may be a position sensor, a camera device, a strain gauge, and/or the like.

As further shown in FIG. 8, process 800 may include determining, based on the second information, third information concerning a current shape of the pipeline (block 830). For example, the pipelaying guidance device (e.g., using one or more processors, one or more memories, and/or the like) may determine, based on the second information, third information concerning a current shape of the pipeline, as described above. The pipelaying guidance device may determine a respective position and a respective orientation of each pipeline segment of the plurality of pipeline segments, and may determine the current shape of the pipeline based on the respective position and the respective orientation of each pipeline segment of the plurality of pipeline segments As further shown in FIG. 8, process 800 may include determining, based on the first information and the third information, fourth information concerning at least one of stress on the pipeline or displacement of the pipeline (block 840). For example, the pipelaying guidance device (e.g., using one or more processors, one or more memories, and/or the like) may determine, based on the first information and the third information, fourth information concerning at least one of stress on the pipeline or displacement of the pipeline, as described above. The pipelaying guidance device may process the third information to determine a current spline of the pipeline, and may compare the original spline of the pipeline and the current spline of the pipeline to determine stress or displacement concerning each pipeline segment of the plurality of pipeline segments As further shown in FIG. 8, process 800 may include causing one or more actions to be performed based on the fourth information (block 850). For example, the pipelaying guidance device (e.g., using one or more processors, one or more memories, and/or the like) may cause one or more actions to be performed based on the fourth information, as described above. The one or more actions to be performed may include generating and sending one or more instructions to at least one pipelayer, where the one or more instructions cause the at least one pipelayer to move a pipeline segment of the plurality of pipeline segments. The one or more actions may include moving a boom of at least one pipelayer, moving a hook component of the at least one pipelayer, or moving one or more tracks of the at least one pipelayer. The one or more actions to be performed may include causing display of: the fourth information, a respective magnitude of stress concerning each pipeline segment of the plurality of pipeline segments, a respective distribution of stress concerning each pipeline segment of the plurality of pipeline segments, and/or a respective direction of stress concerning each pipeline segment of the plurality of pipeline segments Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

INDUSTRIAL APPLICABILITY

In some instances, a plurality of pipelayers may need to lay a plurality of pipeline segments, which are connected together to form a single pipeline, into a final position. Because of a length and a weight associated with the pipeline, the plurality of pipelayers need to work in a coordinated fashion to lay the plurality of pipeline segments in a uniform manner so as to not subject the pipeline to excessive stress that may damage the pipeline and cause the pipeline to fail. However, each pipelayer of the plurality of pipelayers operates independently and may be subject to different operating conditions than another pipelayer (e.g., a different ground slope, a different wind exposure, a different distance from a trench, a different pipeline segment weight, a different pipeline segment length, a different pipelayer lifting capacity, and/or the like), which makes the plurality of pipelayers operating in a coordinated fashion difficult. Moreover, an operator of a pipelayer may be aware that stress on the pipeline needs to be reduced, but may not know what actions the pipelayer needs to perform to reduce the stress on the pipeline.

Accordingly, some implementations described herein may determine that a pipeline is subject to stress as the pipeline is being laid and may perform, or cause to be performed, one or more actions to reduce the stress on the pipeline. As described herein, some implementations may determine an original shape of the pipeline and determine, based on obtaining location data from a plurality of sensing devices associated with a plurality of pipelayers, a current shape of the pipeline as the pipeline is being laid by the plurality of pipelayers. Some implementations may determine, based on the original shape of the pipeline and the current shape of the pipeline, stress information concerning the pipeline and cause one or more actions to be performed to reduce stress on the pipeline. In some implementations, the one or more actions may include moving a pipelayer and/or one or more drive tracks, a boom, a hook component, and/or the like of the pipelayer to move a pipeline segment being laid by the pipelayer.

Some implementations described herein may reduce stress on a pipeline as the pipeline is laid by a plurality of pipelayers. This may, in turn, reduce a probability of the pipeline being damaged (e.g., a crack occurring in one or more pipeline segments, one or more weld points, and/or the like) and failing. This may reduce the time to inspect and/or test a pipeline after the pipeline is laid, reduce the time replace and/or repair a damaged pipeline segment and/or weld point, increase the life expectancy of the pipeline, and/or the like. This may conserve costs associate with laying and/or operating the pipeline by preventing unnecessary damage to the pipeline. This may also avoid wasting resources associated with laying the pipeline, such as creating new plans to replace a pipeline segment and/or weld point, creating a new pipeline segment and/or weld point, installing the new pipeline segment and/or weld point, and/or the like. In addition, this may prevent and/or reduce environmental impacts associated with laying and/or operating the pipeline by reducing a probability of a leak during testing and/or operation of the pipeline.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   obtaining, by a pipelaying guidance device, first information concerning an original shape of a pipeline that comprises a plurality of pipeline segments that are installed into or above ground;
   obtaining, by the pipelaying guidance device and from each sensing device of a plurality of sensing devices, second information concerning each sensing device, each sensing device being positioned at a different position along the pipeline;
   determining, by the pipelaying guidance device and based on the second information, third information concerning a current shape of the pipeline;
   determining, by the pipelaying guidance device and based on the first information and the third information, fourth information concerning at least one of stress on the pipeline or displacement of the pipeline; and causing, by the pipelaying guidance device, one or more actions to be performed based on the fourth information.

2. The method of claim 1, wherein the one or more actions to be performed include generating and sending one or more instructions to at least one pipelayer,
   wherein the one or more instructions cause the at least one pipelayer to move a pipeline segment of the plurality of pipeline segments.

3. The method of claim 1, wherein the one or more actions to be performed include at least one of:
   raising a boom of at least one pipelayer;
   lowering the boom of the at least one pipelayer;
   rotating the boom of the at least one pipelayer;
   raising a hook component of the at least one pipelayer;
   lowering the hook component of the at least one pipelayer;
   moving the at least one pipelayer toward the pipeline;
   moving the at least one pipelayer away from the pipeline;
   moving the at least one pipelayer parallel to the pipeline; or
   rotating the at least one pipelayer.

4. The method of claim 1, wherein determining the third information concerning the current shape of the pipeline comprises:
   processing the second information to determine a respective position and a respective orientation of each pipeline segment of the plurality of pipeline segments; and
   determining the current shape of the pipeline based on the respective position and the respective orientation of each pipeline segment of the plurality of pipeline segments.

5. The method of claim 1, wherein determining the fourth information concerning the at least one of stress on the pipeline or displacement of the pipeline comprises:
   processing the first information to determine an original spline of the pipeline;
   processing the third information to determine a current spline of the pipeline; and
   comparing the original spline of the pipeline and the current spline of the pipeline to determine stress or displacement concerning each pipeline segment of the plurality of pipeline segments.

6. The method of claim 1, wherein the one or more actions to be performed include:
   causing display of the fourth information on a display of at least one pipelayer.

7. The method of claim 1, wherein the one or more actions to be performed include at least one of:
   causing display of a respective magnitude of stress concerning each pipeline segment of the plurality of pipeline segments;
   causing display of a respective distribution of stress concerning each pipeline segment of the plurality of pipeline segments; or
   causing display of a respective direction of stress concerning each pipeline segment of the plurality of pipeline segments.

8. A device comprising:
   a memory; and
   one or more processors to:
      determine an original shape of a pipeline that comprises a plurality of pipeline segments that are installed into or above ground;
      obtain current location data concerning a respective position of each pipeline segment of the plurality of pipeline segments;
      determine a current shape of the pipeline based on the current location data;
      calculate, based on the original shape of the pipeline and the current shape of the pipeline, stress information concerning the pipeline; and
      perform one or more actions based on the stress information.

9. The device of claim 8, wherein the one or more processors, when obtaining the current location data concerning the respective position of each pipeline segment of the plurality of pipeline segments, are to:
   obtain the current location data from a plurality of global positioning system (GPS) devices associated with the pipeline.

10. The device of claim 8, wherein the one or more processors, when obtaining the current location data concerning the respective position of each pipeline segment of the plurality of pipeline segments, are to:
    obtain the current location data from a plurality of camera devices,
       wherein each camera device, of the plurality of camera devices, is associated with a pipelayer of a plurality of pipelayers.

11. The device of claim 8, wherein the one or more processors, when performing the one or more actions based on the stress information, are to:
    send a message to at least one pipelayer,
       wherein the message includes an instruction for an operator of the at least one pipelayer to operate the at least one pipelayer to move at least one pipeline segment of the of plurality of pipeline segments.

12. The device of claim 8, wherein the one or more actions include:
    moving a boom of at least one pipelayer;
    moving a hook component of the at least one pipelayer; or
    moving one or more tracks of the at least one pipelayer.

13. The device of claim 8, wherein the one or more processors, when calculating the stress information concerning the pipeline, are to:
    determine, based on the original shape of the pipeline, an original shape of a subset of the plurality of pipeline segments;
    determine, based on the current shape of the pipeline, a current shape of the subset; and
    compare the original shape of the subset and the current shape of the subset to determine particular stress information concerning the subset.

14. The device of claim 13, wherein the particular stress information includes at least one of:
    a magnitude of stress on one or more weld joints of the subset;
    a distribution of stress on one or more weld joints of the subset; or
    a direction of stress on one or more weld joints of the subset.

15. A system comprising:
    a plurality of pipelayers;
    a plurality of devices;
    a pipelaying guidance device to:
       determine an original shape of a pipeline comprised of a plurality of pipeline segments that are installed into or above ground;
       obtain respective current location data from the plurality of devices;
       determine a current shape of the pipeline based on the current location data;

calculate, based on the original shape of the pipeline and the current shape of the pipeline, stress information concerning the pipeline;

generate, based on the stress information, one or more instructions; and send the one or more instructions to at least one pipelayer of the plurality of pipelayers to cause the at least one pipelayer to perform an action.

16. The system of claim 15, wherein the one or more instructions include executable computer code to perform one or more actions, wherein the one or more actions include at least one of:
adjusting a position of a boom of the at least one pipelayer;
adjusting a position of a hook component of the at least one pipelayer; or
adjusting a position of one or more tracks of the at least one pipelayer.

17. The system of claim 15, wherein the pipelaying guidance device is further to:

cause a display device to display a three-dimensional (3D) model of the current shape of the pipeline;

cause the display device to display the stress information relating to axial stress as a first color on the 3D model;

cause the display device to display the stress information relating to shear stress as a second color on the 3D model; and cause the display device to display the stress information relating to bending stress as a third color on the 3D model.

18. The system of claim 15, wherein the pipelaying guidance device, when determining the current shape of the pipeline based on the current location data, is to:

determine, based on the current location data, a respective position and a respective orientation of each pipeline segment of the plurality of pipeline segments; and process, for each pipeline segment of the plurality of pipeline segments, the position and the orientation of the pipeline segment to determine the current shape of the pipeline.

19. The system of claim 15, wherein a device of the plurality of devices includes:
a potentiometer;
a rotary position sensor;
an optical sensor;
a piezo-electric transducer;
a relative position sensor;
a global positioning system (GPS) device; or
a camera device.

20. The system of claim 15, wherein the pipelaying guidance device, when obtaining the current location data from the plurality of devices, is to:

communicate with the plurality of devices via a wireless communication protocol that supports mesh networking.

* * * * *